United States Patent [19]
Schendel

[11] 3,853,005
[45] Dec. 10, 1974

[54] INTERFACE MEASURING APPARATUS

[75] Inventor: Robert E. Schendel, Houston, Tex.

[73] Assignee: Measurand Systems, Houston, Tex.

[22] Filed: Aug. 29, 1973

[21] Appl. No.: 392,849

[52] U.S. Cl. ......... 73/290 R, 73/304 R, 324/58.5 B
[51] Int. Cl. ............................................. G01f 23/28
[58] Field of Search ...................... 73/290 R, 304 R; 324/58.5 R, 58.5 B

[56] References Cited
UNITED STATES PATENTS

| | | | |
|---|---|---|---|
| 3,296,862 | 1/1967 | Ziniuk | 73/290 R |
| 3,424,002 | 1/1969 | Johnson | 73/290 R |
| 3,695,107 | 10/1972 | Hertz et al. | 73/290 R |
| 3,703,829 | 11/1972 | Dougherty | 73/290 R |

Primary Examiner—Richard C. Queisser
Assistant Examiner—Frederick Shoon
Attorney, Agent, or Firm—Michael P. Breston

[57] ABSTRACT

Apparatus for measuring the location of an unknown interface between two or more media having different dielectric constants. A center conductor forming part of a transmission line is positioned across the unknown interface. A reference interface is selectively simulated near the input to the center conductor. A pulse generator transmits a pulse to the transmission line. The pulse is alternatingly reflected from the reference interface and from the unknown interface. The reflected pulses establish oscillations in a feedback loop around the generator. By measuring a parameter of the reflected pulses an accurate measurement of the location of the unknown interface is obtained.

2 Claims, 3 Drawing Figures

PATENTED DEC 10 1974

3,853,005

INTERFACE MEASURING APPARATUS

BACKGROUND OF THE INVENTION

The measurement of an unknown interface between two media of different dielectric constants is of considerable importance to many industrial applications. In some such applications, it is desired to monitor with great precision the location of an unknown interface between two fluids and/or solids. Changes in the level of an interface need be accurately detected, for example, to produce early warning signals so that remedial steps can be taken. One known method for measuring the location of an interface is to position a transmission line, which typically is a coaxial cable, across the interface. Various instruments have been proposed to drive such a transmission line. Essentially, such instruments impress a fast-rising pulse onto the center conductor of the transmission line. This pulse is partially reflected from the interface. By making the travel time of the pulse to and from the interface considerably longer than the travel time of the pulse within the instrument, i.e., within the active networks which generate and monitor the pulse, it is possible to measure the location or level of the unknown interface with medium accuracy.

For many applications, the shortest physical length of the center conductor that may be used is on the order of 10 feet or less. To make the electrical length of the center conductor very long compared to its physical length, the center conductor is wound into a monolayer coil. In some media, the use of such a coil is objectionable because the medium will attach to the external wall of the coil. Such an effect makes for a fuzzy and inaccurate measurements. An example of a medium that could attach to such a coil is drilling mud.

Using prior art methods, if the center conductor in a short transmission line were not wound but left straight, then unavoidable small changes in the physical and electrical components of the instrument would make the interface measurements to be of very low precision.

REFERENCE TO RELATED APPLICATION

A preferred probe for use with the present invention is described in my copending patent application Ser. No. 447,707, filed Mar. 4, 1974.

SUMMARY OF THE INVENTION

This invention generally relates to the measurement of unknown interfaces between adjacent media having different dielectric constants. A center conductor forming part of a transmission line is positioned across the interfaces desired to be measured. A signal generator is coupled to the input of the transmission line for applying thereto fast-rising pulses of short duration. A reference interface is simulated near the input to the center conductor of the transmission line. The applied pulses are allowed to become selectively reflected from the reference and unknown interfaces. Measurements are made of the signal generator's frequencies of oscillation with the simulated reference interface ON and OFF. From a comparison of the measured frequencies, a precise measurement of the location of the unknown interface is obtained.

Figure 1:
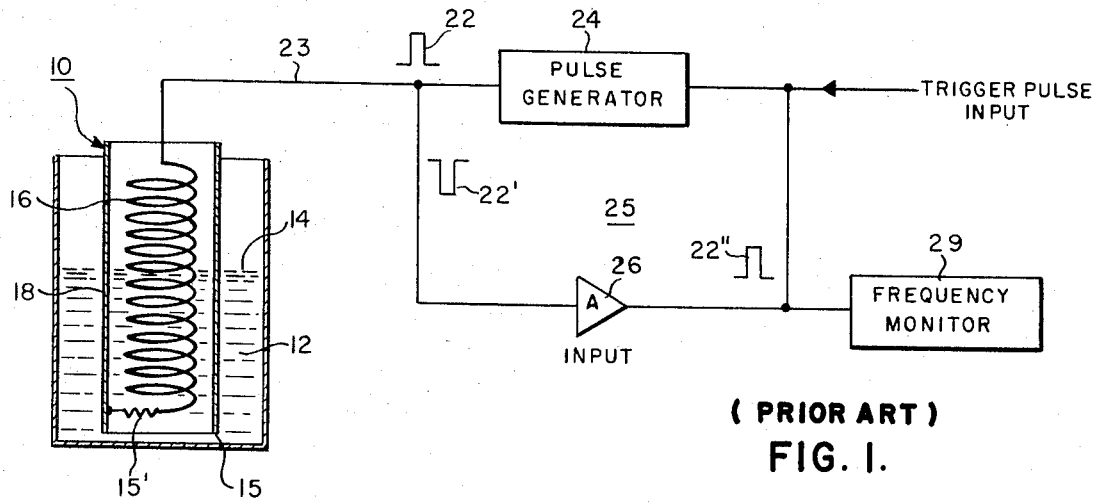
FIG. 1 shows a schematic representation of a typical prior art instrument for measuring and locating an unknown interface between two fluids using a probe serving as a transmission line.

A typical prior art interface measuring instrument is shown in FIG. 1. It includes a probe 10 which is immersed in a liquid 12, say water. It is the purpose of probe 10 to measure the location of the air-water interface 14 relative to the end 15 of the probe which is suitably terminated by a resistor 15' to avoid reflections from the bottom of the probe. Probe 10 has a center conductor 16 wound into a monolayer coil. An outer cylindrical tube 18 serves as a return conductor for the probe which constitutes a transmission line. The probe is open at least at its bottom end and water fills the inside of the probe to the interface level outside the probe. As is well known to those skilled in the art, the air-liquid interface 14 provides an abrupt change in the impedance of the probe at the interface level. This abrupt change is of course due to the fact that air and water have different dielectric constants. When a pulse 22 of say positive polarity is impressed on the center conductor 16 through a line 23 by a pulse generator 24, the pulse will travel down coil 18 until it reaches interface 14 from which it will be partially reflected as a negative pulse 22'. The pulse generator to produce its first pulse is triggered by an outside trigger pulse input.

The negative pulse 22' will travel around a feedback loop 25 coupled between the input and output of pulse generator 24. The feedback loop 25 includes an input amplifier 26 which amplifies and inverts the reflected pulse 22'. The now positive pulse 22'' from the output of the input amplifier 26 will trigger the pulse generator 24 to produce another output pulse 22 for transmission to the center conductor 16. In this manner sustained pulse oscillations are established. By measuring the frequency of oscillations with a frequency measuring instrument 29 suitably coupled to any point on loop 25, it is possible to obtain a low-precision measurement of the location of the air-water interface 14 within probe 10.

In practice, the active electronic components and networks forming feedback loop 25 and pulse generator 24 vary with changes in environmental conditions and with aging. Accordingly, the travel time of the transmitted pulse 22 from the pulse generator 24 to the input of the probe 10 and the travel time of the reflected pulse 22' from the interface back to the input of the pulse generator will vary depending on the time of measurement. As a result, wide frequency variations will be caused by aging of electronic components and variations in the environmental conditions surrounding the pulse generator and associated monitoring equipment. Inasmuch as these frequency variations are likely to be greater than the frequency variations produced by changes in the location of the interface within the probe, it will be apparent that the accuracy of the prior art interface measurements are likely to be extremely poor.

To overcome such poor measurements, the prior art found it essential to wind the center conductor 16 into a coil in order to considerably increase its electrical length inside probe 10. In this fashion, the total travel time of the incoming pulse 22 and of the reflected pulse 22' inside probe 10 is correspondingly increased compared to the total travel time of these pulses 22, 22' outside of the probe. With a coiled center conductor, the prior art method assumes that the frequency variations, due to electronic component aging and to changes in environmental conditions, will be small compared to the frequency changes produced by the changes in the interface location within probe 10.

In fact, while a coiled center conductor 16 greatly improves the accuracy of interface measurement, as compared to a straight center conductor, the precision of interface measurement is still not as great as that required in some critical industrial applications wherein small changes in the level of the interface inside the probe can cause catastrophic results.

In accordance with the present invention, very precise interface measurements are achieved even with a straight center conductor 16 within probe 10.

Figure 2:
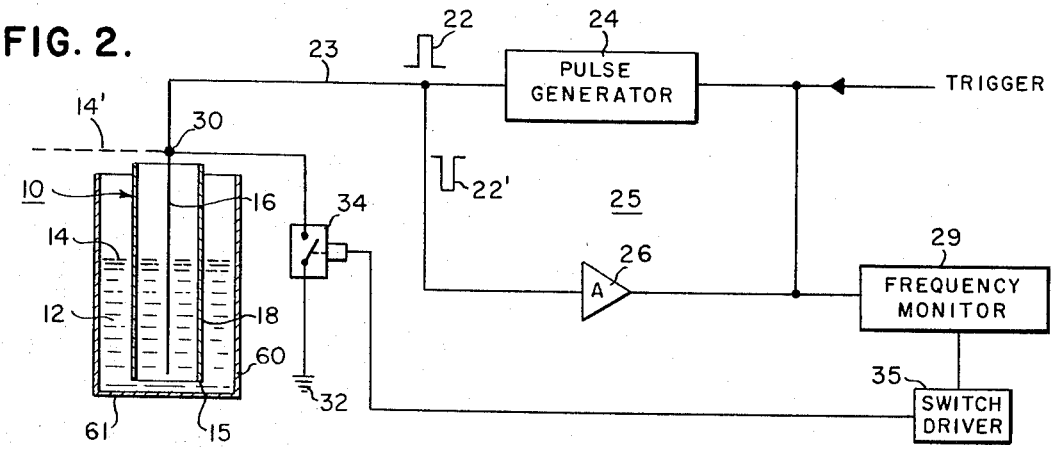
FIG. 2 is a block diagram representation of an interface measuring instrument embodying the present invention.

For a general description of the present invention reference is made to FIG. 2 which is arranged, in a manner similar to FIG. 1, so as to bring out one of the essential differences between the prior art practice and the present invention. Also, for the same reason, the same reference characters are used in FIGS. 1 and 2 whenever possible to designate the same or similar parts.

In accordance with the invention, there is selected a reference point 30 on the input line 23 which feeds the applied pulse 22 to a straight center conductor 16 in probe 10. The reference point 30 is preferably selected as near to the input of the center conductor as conveniently possible. An interface 14' is simulated at the reference point 30. Since the center conductor is preferably left straight, its physical length is the same as its electrical length. Of course, this invention is not limited to the use of a straight center conductor. A coiled center conductor could also be employed. The accuracy provided by the method of the present invention is sufficiently great that in most installations there seldom will be a need for coiling the center conductor 16.

The simulation of a reference interface 14' is accomplished by connecting reference point 30 to a reference potential level which can most conveniently be ground 32. Since it is desired to alternatingly and selectively establish and remove the reference interface 14', there is connected between reference point 30 and ground 32 an ON and OFF switch 34 preferably of the electronic variety which in its simplest form could be a single transistor (not shown). The operation of switch 34 is controlled by a switch driver 35 which is synchronized with the measured frequency by the frequency monitor 29.

Monitor 29 has a CALIBRATE operating mode, when it measures the simulated reference interface 14', and a MEASURE mode, when it measures the unknown interface 14. By comparing or subtracting the frequency measurement, or its equivalent, corresponding to interface 14', when switch 34 is ON, with or from the frequency measurement or its equivalent corresponding to the unknown interface 14, when switch 34 is OFF, there is obtained an accurate measurement of the position of the unknown interface 14 within probe 10.

Figure 3:
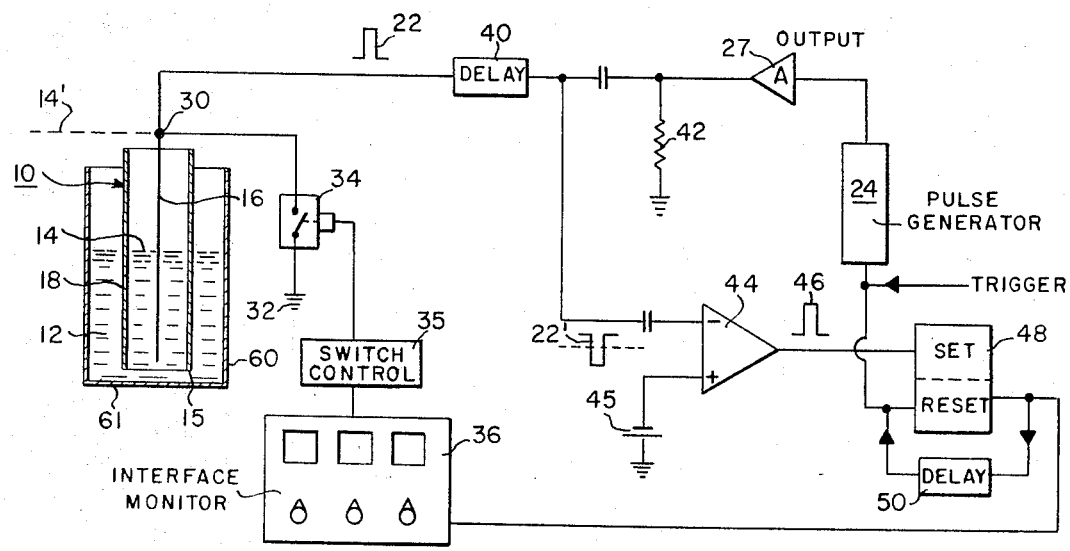
FIG. 3 is a more detailed block diagram representation of the instrument shown in FIG. 2.

Referring now to FIG. 3, with reference to which this invention is described in greater specificity, from a knowledge of the physical characteristics of the coaxial probe 10 which constitutes the transmission line and from the nature of the dielectric constants involved, the characteristic impedance of probe 10 can be computed. The inner center conductor 16 is straight so that again its electric length is equivalent to its physical length. The transmitted pulse 22 impressed upon the center conductor 16 is made as fast rising as possible so that it can be reflected almost immediately upon reaching either the reference interface 14' or the unknown interface 14. Pulse 22 is applied from the pulse generator 24 through a suitable delay line 40, which can be a piece of calibrated coaxial cable. The purpose and function of delay line 40 is to separate in the time domain the applied pulse 22 from the reflected pulse 22'. The input end to the delay line 40 includes a suitable impedance network which for the sake of simplicity is shown as a resistor 42 whose function is to preclude the reflection of pulse 22' through the delay line 40 in the direction of probe 10.

Multiple reflections are prevented throughout by matching the impedance of resistor 42 to the characteristic impedance of the delay line 40 and to the characteristic impedance of the probe 10, as will be understood by those skilled in the art.

The reflected negative pulse 22' is applied to the negative input terminal of a comparator amplifier 44 whose positive input terminal is connected to a negative reference potential 45. When the amplitude of the reflected pulse 22' falls below the negative reference potential 45, amplifier 44 will generate a positive output pulse 46. Coupled to the output of amplifier 44 is a flip-flop 48. Pulse 46 sets the flip-flop from a logic ZERO to a logic ONE. This step change propagates through another delay line 50 which could be also a section of a calibrated coaxial cable.

After traversing the delay line 50, the step change produced by flip-flop 48 resets the flip-flop back to its original ZERO state and simultaneously triggers the pulse generator 24 to produce another pulse 22. Pulse generator 24 operates only when it receives a logic ONE from delay line 50. The duration of pulse 22 may be on the order of 10 nanoseconds. It is amplified by an output amplifier 27.

The thusly generated pulse 22 will be reflected either from the simulated reference interface 14' or from the unknown interface 14 depending on whether switch 34 is ON or OFF. In any event, the reflected pulse 22' will return to the negative input of amplifier 44 to again reset the flip-flop 48 from a logic ZERO to a logic ONE thereby starting the cycle of operation all over again.

These conditions are sufficient to the establishment of oscillation around pulse generator 24. The base frequency of oscillation $F_b$ is that frequency which corresponds to reference interface 14' when switch 34 in ON, that is when point 30 is connected to ground 32. A measurement of this base frequency $F_b$, during a predetermined time interval, by an interface monitor 36 constitutes the CALIBRATE mode of the monitor. The monitor stores $F_b$ or a number which corresponds to $F_b$, which could be the period $T_b$ of the base frequency, where $T_b = 1/F_b$.

In its MEASURE mode, monitor 36 will measure the frequency of the oscillating system with the switch 34

OFF to thereby allow the reflected pulse 22' to arrive from the unknown interface 14. The signal generator 24 will be allowed, just as in the CALIBRATE mode, to run for a predetermined number of cycles to thereby produce a frequency $F_m$ which is smaller than $F_b$, since the time required for the impressed pulse 22 to reach the unknown interface 14 is greater than the time required for pulse 22 to reach the simulated reference interface 14'. Again, $F_m$ or a number corresponding to $F_m$, which could be its period $T_m$, is stored in monitor 36. The two stored numbers $T_b$ and $T_m$ are subtracted to provide $T_i$ which represents the time required for the impressed pulse 22 to travel roundtrip between point 30, or interface 14', and interface 14.

In other words, $T_i$ represents the electrical length of the center conductor 16 between reference point 30 and the unknown interface 14. This electrical length is of course the length of the portion of the center conductor which is not covered by the liquid medium (water in the illustration). From a knowledge of the physical parameters of probe 10 and of the measured value $T_i$, it is possible to calculate $T_1$ which is the time it would take for the impressed pulse 22 to make a roundtrip between reference point 30 and the end 15 of probe 10. Subtracting $T_i$ from $T_1$ yields $T_2$ which is the time it would take for pulse 22 to make the roundtrip between interface 14 and the end 15 of probe 10. $T_2$ now corresponds to the electrical length of the center conductor 16 which is covered by the fluid inside probe 10.

Since the electrical length and the physical length of conductor 16 are the same, it is desirable to express $T_2$ in engineering units other than time such as: in gallons of liquid in the reservoir 60 containing probe 10, or in units of length corresponding to the position of interface 14 relative to the bottom 61 of reservoir 60, etc. Such transformations are accomplished by multiplying $T_2$ by suitable scaling factors. The various computations and conversions are carried out by conventional computer networks including frequency counters, preferably of well-known digital types, all contained inside monitor 36.

Thus, in general, by measuring a parameter of the reflected pulses from actual interface 14 and reference interface 14', such as their frequency or period, there is obtained, in accordance with this invention an accurate measurement of the location of the unknown interface 14 within probe 10.

While this invention has been described with reference to specific networks and applications, it will be appreciated that its use will find a wide range of applications wherever it is desired to determine the accurate location of an unknown interface separating two media of different dielectric constants. Each interface could separate gases from liquids, or different liquids, or solids from liquids or any combinations thereof. Accordingly, this invention is to be limited only by the claims attached hereto.

What is claimed is:

1. In an apparatus for measuring the location of an unknown interface separating two media having different dielectric constants, a transmission line positioned across said interface, a switch connected between ground and a reference interface on the center conductor of said transmission line, a signal generator for generating a fast rising output pulse which is reflected from the unknown interface when the switch is open and which is reflected from the reference interface when the switch is closed, the improvement comprising:

a switch driver for closing and opening said switch, a frequency monitor for measuring the frequency of the pulses reflected from said reference interface and for measuring the frequency of the pulses reflected from said unknown interface, to thereby obtain a measurement of said unknown interface, and means coupling said frequency monitor to said switch driver to automatically open said switch after measurement of said reference interface.

2. In an apparatus for measuring the location of an unknown interface separating two media having different dielectric constants, a transmission line positioned across said interface, a switch connected between ground and a reference interface on the center conductor of said transmission line, a pulse generator applying a fast rising output pulse to said center conductor which is reflected from the unknown interface when the switch is open and which is reflected from the reference interface when the switch is closed, the improvement comprising: a first delay network coupled to the output of said pulse generator to separate in the time domain the applied pulse from the reflected pulse during each measurement cycle; a comparator amplifier having two input terminals, the reflected pulse being applied to one of said input terminals and the other input terminal being connected to a reference potential, said comparator amplifier generating an output pulse when the amplitude of the reflected pulse falls below the reference potential; a flip-flop network coupled to the output of said comparator amplifier, the output pulse from said comparator amplifier changing the original state of said flip-flop network; a second delay network connected between the input and output of said flip-flop for resetting the flip-flop to its original state and simultaneously retriggering said pulse generator to produce another pulse; the reflected pulse from said other pulse returning to said one terminal of said comparator amplifier to again reset the flip-flop to start another measurement cycle whereby oscillations are established around said pulse generator, the base frequency of such oscillations corresponding to the reference interface when said switch is closed and to said unknown interface when said switch is open; an interface monitor coupled to said flip-flop for measuring the corresponding frequencies during a predetermined time interval to obtain an accurate measurement of said reference and unknown interfaces; and a switch controller coupled to said interface monitor for automatically opening and closing said switch in response to the measured frequencies.

* * * * *